United States Patent [19]

Patzelt

[11] Patent Number: 4,854,947
[45] Date of Patent: Aug. 8, 1989

[54] PAINT DETACKIFICATION USING OIL-IN-WATER EMULSIONS FROM OILY WASTE TREATMENT PLANTS

[75] Inventor: Robert R. Patzelt, Wheaton, Ill.

[73] Assignee: Nalco Chemical Company, Naperville, Ill.

[21] Appl. No.: 252,314

[22] Filed: Oct. 3, 1988

[51] Int. Cl.$^4$ ............................................. E01D 47/00
[52] U.S. Cl. .......................................... 55/85; 55/89; 210/708
[58] Field of Search ...................... 55/84, 85, 89, 45; 210/708; 98/115.1, 115.2, 115.3

[56] References Cited

U.S. PATENT DOCUMENTS

| | | | |
|---|---|---|---|
| 4,378,235 | 3/1983 | Cosper et al. | 55/85 |
| 4,750,919 | 6/1988 | Patzelt et al. | 55/45 |

*Primary Examiner*—Frank Sever
*Attorney, Agent, or Firm*—John G. Premo; Donald G. Epple; Anthony L. Cupoli

[57] ABSTRACT

A method of detackifying oversprayed paints chosen from the group consisting of high solids enamels, clear coats, two-phase urethane paints, and water or solvent borne base coats which comprises the contact of said oversprayed paint with an oil-in-water emulsion having:

(a) 1–50 weight percent of a hydrocarbon oily liquid having a boiling point of at least 150° C.;
(b) 0.1–25 weight percent, based on the oily liquid, of an oil-in-water emulsifier;
(c) the remainder, water;

which emulsion has a pH of from 7.5–12.0 and then detackifying through said contact within a paint spray booth to form a detackified oversprayed paint particulate and then, collecting and dispersing said detackified paint particulate within the oil-in-water emulsion, thereby forming a spent oil-in-water emulsion containing at least 5 parts of detackified paint particulate per 100 parts of hydrocarbon oily liquid contained in said spent oil-in-water emulsion.

5 Claims, No Drawings

PAINT DETACKIFICATION USING OIL-IN-WATER EMULSIONS FROM OILY WASTE TREATMENT PLANTS

INTRODUCTION

Paint detackification by exposure of oversprayed paint particulates in a paint spray booth operating by recirculating a liquid curtain comprising an oil-in-water emulsion having from 1–50 weight percent of a hydrocarbon oily liquid, which liquid boils at at least 150° C., and from 0.1–25 weight percent based on the oily liquid, of an oil-in-water emulsifier, and the remainder being water, which emulsion has a pH of from 7.5–12.0, has been taught in the following U.S. patents: U.S. Pat. No. 4,396,405, Lindenberger, et al; U.S. Pat. No. 456,319,9, Lindenberger, et al; U.S. Pat. No. 4,378,235, Cosper, et al; and U.S. Pat. No. 4,750,919, Patzelt, et al.

In addition paint detackification and control of hydrocarbon emissions can be achieved by using a solution of various hydrotropes in water. The use of hydrotropes is described in the following U.S. patents: U.S. Pat. No. 4,444,573, Cosper, et al; U.S. Pat. No. 4,523,932, Cosper, et al; U.S. Pat. No. 4,554,026, Cosper, et al.

Except for the Patzelt reference above, U.S. Pat. No. 4,750,919, the other references teach control of hydrocarbon emissions using the oil-in-water emulsion described therein. All of the patents cited above are incorporated herein by reference.

Patzelt teaches using the oil-in-water emulsion to detackify paint solids, to collect these paint solids in the oil-in-water emulsion, and to disperse the detackified paint solids in this emulsion until at least a portion of the paint solids equal to about 5 parts of detackified paint particulate per 100 parts of hydrocarbon liquid contained in the emulsion is achieved. Patzelt then removes this solid from the emulsion in the processes taught within his patent.

Patzelt, however, in spite of references to various kinds of paints, does not specify that his system is particularly useful in detackifying high solids enamels, urethane based clear coat and water borne base coats, which paints have particularly become useful in the industry because of requirements to control volatile organic carbon and varpors normally and previously observed when operating paint spray booths coating metallic and/or plastic based pieces with these paints. It therefore, would be an advance in the art to have a method to successfully detackify all of the above types of specialty paints.

It is the object of this invention to teach a method of detackifying all of the specialty paints chosen from the group of high solids enamels, clear coats, such as urethane based clear coats, and water borne base coats, as well as water borne enamels, which are used to paint large numbers of metal and/or plastic pieces, particularly pieces used in the manufacture of automobiles.

Surprisingly, the oil-in-water emulsions previously known to detackify low solids enamels and lacquers can achieve the detackification of oversprayed paints chosen from the group consisting of high solids enamels, clear coats, urethane-based clear coats, water borne base coats, solvent borne base coats, water borne enamels, high solids two-component urethane paints, and the like. This is surprising because most other treatments to detackify various types of paints do not detackify all of the various types of paints that can be used, but instead, must be formulated especially for each paint type. For example, a silica based paint detackifier using phenol-formaldehyde polymers will detackify a lacquer and perhaps a low-solids enamel, but is unsuccessful when used with high solids enamel and totally fails with urethane based clear coats.

This method of detackifying these newer oversprayed paints comprises contacting said oversprayed paints with an oil-in-water emulsion having from 1–50 weight percent of a hydrocarbon oily liquid, which liquid boils at at least 150° C., from 0.1–25 weight percent, based on the oily liquid of an oil-in-water emulsifier; and the remainder, water; which emulsion preferably has a pH ranging from about 7.5–12.0. Contacting the oversprayed paint with such an oil-in-water emulsion detackifies the oversprayed paint particulates and collects and disperses these detackified paint particulates within the oil-in-water emulsion thereby forming a spent oil-in-water emulsion containing at least 5 parts of detackified paint particulate per 100 parts of hydrocarbon oily liquid contained in said spent oil-in-water emulsion.

Many attempts have been made to achieve detackification of various kinds of paints used in paint spray booths where water only is being circulated to collect paint particulates. Such detackification chemicals include organic polymers, silicas and silicates, various inorganic and organic mixtures which, when dissolved or dispersed in the water used in the paint spray booth, collects and detackifies oversprayed paint. However, until the above invention using oil-in-water emulsion, no common formulation existed which detackified the new paints chosen from the group consisting of high solids enamels, clear coats, and water borne base coats, particularly water borne enamel base coats.

It is surprising, given the art of detackification in water systems, that a system with such commonality can consistently be relied upon to detackify oversprayed paint particulates, collect and disperse these detackified paint particulates in a manner which allows for the collection of the paint particulates in the operation of the paint spray booth in a clean, efficient manner, without accumulating on parts and surfaces of said paint spray booth, various amounts of partially detackified or undetackified paint particulates. The method of the instant invention accomplishes this.

It particularly holds that the method of the instant invention can detackify paint particulates obtained from contacting high solids enamel paints with the oil-in-water emulsion of this invention. Also, the invention is capable of detackifying paint particulates obtained from contacting a urethane based clear coat with the oil-in-water emulsions of this invention. Also, the detackified paint particulates may be obtained by contacting a water borne base coat or any kind of solvent borne base coat used prior to application of the clear coats, particularly urethane based clear coats, and even the high solids two-phase urethane paints, with the oil-in-water emulsion of this invention. And finally, even when using combinations of mixtures of high solids enamels as base coats, be they water borne or solvent borne, and clear coats, the instant invention may detackify effectively any paint particulates contacted by the oil-in-water emulsions of this invention.

In addition to the usual oils or hydrocarbon liquids used to manufacture the oil-in-water emulsion, as taught in the prior art, it is also feasible that the hydrocarbon oily liquid emulsion may be obtained, at least in part, from treatment of oily waste emulsions derived from metal stamping, metal working, and tooling operations, which normally occur within an automotive manufacturing plant. These oily waste emulsions are normally obtained because various stamping operations, metal working operations, and/or tooling operations use oil based lubricants and/or water based lubricants to form metallic parts formed by metal stamping or to form various parts, tools, and the like from molding or drilling or shaving metal parts using such lubricants. These waste emulsions are difficult to treat but such treatment is available and known in the art, e. g. in U.S. patents: U.S. Pat. No. 3,315,181, Sackett, et al; U.S. Pat. No. 3,585,148, Sackett; U.S. Pat. No. 3,691,086, Reid, et al; U.S. Pat. No. 4,026,794, Mauceri; U.S. Pat. No. 4,077,930, Lim, et al; and U.S. Pat. No. 4,154,698, Doft, all of which are incorporated herein by reference.

The above patents include teachings to treat these oily waste emulsions to recover therefrom the hydrocarbon phases as oils and hydrocarbon liquids.

Therefore, by use of the hydrocarbon oily liquid derived from recovered waste oils, a certain economy can be achieved within the operation of the automobile manufacturing facility wherein both metal stamping, metal working and tooling operations occur and paint spray booths are operated with the oil-in-water emulsion system.

When using the recovered oil phases from waste emulsions, it is preferred that the hydrocarbon oily liquid of the oil-in-water emulsion used in the paint spray booth contain at least 5 weight percent of recovered waste oils obtained and recovered by treating an oily waste emulsion from metal stamping, metal working, and tooling operations within an automotive manufacturing plant. The hydrocarbon oily liquid is recovered by treating said oily waste emulsions to break the emulsion into water, oil, and solid phases, then separating said oil phase from the other water and solid phases, filtering said oil phase to remove whatever suspended matter might still exist, and thereby recovering a waste oil for use in making the oil-in-water emulsion used in paint spray booths. Although it is preferred that at least 5 weight percent of recovered waste oil is used to manufacture the oil-in-water emulsion useful in a paint spray booth, as much as 20 weight percent of such recovered waste oil may be used, and in fact as much as 100 percent may be used if such quantities are available. The only restriction on the use of such a recovered waste oil is the restriction originally taught in the art of the waste oil having a boiling point of at least 150° C., and being capable of forming the oil-in-water emulsions described in the prior art, and herein.

To exemplify our invention, it would be expected that oversprayed paint chosen from the group consisting of urethane based clear coats, high solids enamels, water borne enamels, high solids base coats, both water borne and solvent borne, and two-phase urethane paints are detackified by contacting the oversprayed paints with an oil-in-water emulsion having the following formulation:
70–75% water
23–27% 100 sec. Process Oil
0.2–3% oleic acid,
and sufficient caustic and sulfuric acid to adjust pH to about 8.0–8.5.

When circulating the above formula through an operating paint spray booth, which paint spray booth is operating on any one or a combination of the above described paints, it is observed that the oversprayed paint particulates are detackified in all cases, that the detackified paint particulates are collected and suspended in the oil-in-water emulsion, and collected and dispersed within said oil-in-water emulsions in a way that prevents accumulation of the oversprayed paint, or the oversprayed detackified paint, or any mixture which might partially be detackified. The oil-in-water emulsion is capable of, in addition, removing and suspending any residual paint particulates, detackified paint particulates, or any mixture thereof, which might have earlier been accumulated in said paint spray booth system. When such an oil-in-water emulsion has achieved suspended matter to form a spent oil-in-water emulsion containing at lesat 5 parts of detackified paint particulates of the above types per 100 parts of hydrocarbon oily liquid, or above, it is possible by using techniques taught in the prior art to remove said detackified paint particulates and to recycle and recover those portions of the oil-in-water emulsion which might be useful again.

It is expected that replacement of a portion of the hydrocarbon oily liquid used to manufacture the oil-in-water emulsion with recovered waste oils as described above, will achieve certain economies when operating paint spray booths with the oil-in-water emulsion. Said portion can be at least 5 weight percent, based on the total amount of hydrocarbon oily liquid within said oil-in-water emulsion, of recovered waste oil obtained by treating oily waste emulsions derived from metal stamping, metal working and metal tooling operations, within an automotive manufacturing plant.

Having described my invention, I claim:

1. A method comprising: detackifying oversprayed paints chosen from the group consisting of high solids enamels, two-phase urethane paints, clear coats, and water or solvent borne base coats by the contact of said oversprayed paint with an oil-in-water emulsion having:
   (a) 1–50 weight percent of a hydrocarbon oily liquid having a boiling point of at least 150° C.;
   (b) 0.1–25 weight percent, based on the oily liquid, of an oil-in-water emulsifier;
   (c) the remainder, water; which emulsion has a pH of from 7.5–12.0 and then detackifying through said contact within a paint spray booth to form a detackified oversprayed paint particulate and then, collecting and dispersing said detackified paint particulate within the oil-in-water emulsion sufficient to form a spent oil-in-water emulsion containing at least 5 parts of detackifying paint particulate per 100 parts of hydrocarbon oily liquid contained in said spent oil-in-water emulsion.

2. The method of claim 1 wherein the detackified paint particulates are obtained from contacting a high solids enamel paint with the oil-in-water emulsion.

3. The method of claim 1 wherein the detackified paint particulates are obtained from contacting a urethane based clear coat with the oil-in-water emulsion.

4. The method of claim 1 wherein the detackified paint particulates are obtained from contacting a water borne base coat with the oil-in-water emulsion.

5. The method of claim 1 wherein the hydrocarbon oily liquid of the oil-in-water emulsion contains at least 5 weight percent of recovered waste oil obtained and recovered by treating an oily waste emulsion from metal stamping, metal working, and tooling operations within an automotive manufacturing plant by treating said oily waste emulsions to break the emulsion into water, oil, and solid phases, separating said oil phase, filtering said oil phase to remove suspended matter, thereby recovering a waste oil for use in making the oil-in-water emulsion.

* * * * *